(12) United States Patent
Shintani

(10) Patent No.: US 11,190,835 B2
(45) Date of Patent: Nov. 30, 2021

(54) INTELLIGENT UNLOAD OF BROADCASTER APPLICATION ON CHANNEL CHANGE

(71) Applicant: Sony Corporation, Tokyo (JP)

(72) Inventor: Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 11 days.

(21) Appl. No.: 16/794,191

(22) Filed: Feb. 18, 2020

(65) Prior Publication Data
US 2021/0258633 A1 Aug. 19, 2021

(51) Int. Cl.
| | |
|---|---|
| *H04N 21/438* | (2011.01) |
| *H04N 21/439* | (2011.01) |
| *G10L 15/22* | (2006.01) |
| *H04N 21/433* | (2011.01) |

(52) U.S. Cl.
CPC ......... *H04N 21/4383* (2013.01); *G10L 15/22* (2013.01); *H04N 21/433* (2013.01); *H04N 21/4394* (2013.01); *G10L 2015/223* (2013.01)

(58) Field of Classification Search
CPC ........... H04N 21/4383; H04N 21/4394; H04N 21/433; G10L 15/22; G10L 2015/223
See application file for complete search history.

(56) References Cited

U.S. PATENT DOCUMENTS

| | | | | |
|---|---|---|---|---|
| 6,118,498 | A * | 9/2000 | Reitmeier | H04N 5/455 |
| 2007/0046816 | A1* | 3/2007 | Hong | H04N 5/44 |
| 2017/0272543 | A1* | 9/2017 | Lo | H04L 67/34 |

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Standard: ATSC 3.0 Interactive Content (A/344)", May 2, 2019.
"ATSC Standard: ATSC 3.0 Security and Service Protection", Aug. 20, 2019.
"ATSC Standard: ATSC 3.0 System", Sep. 17, 2019.
"ATSC Standard: Signaling, Delivery, Synchronization, and Error Protection (A/331)", Jun. 19, 2019.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

(Continued)

*Primary Examiner* — Anthony Bantamoi
(74) *Attorney, Agent, or Firm* — John L. Rogitz

(57) ABSTRACT

Techniques are described for expanding and/or improving the Advanced Television Systems Committee (ATSC) 3.0 television protocol in robustly delivering the next generation broadcast television services. Upon channel change, the existing broadcaster application for the service being tuned away from is unloaded only responsive to a determination that the new service being tuned to requires a different broadcaster app.

20 Claims, 5 Drawing Sheets

(56) References Cited

OTHER PUBLICATIONS

"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (GCM)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-Volume Environments," A. Deacon, R. Hurst, Internet Engineering Task Force, Fremont, CA, Sep. 2007.
"ATSC Standard: Application Signaling" (A337:2018), Jan. 2, 2018.

* cited by examiner

INTELLIGENT UNLOAD OF BROADCASTER APPLICATION ON CHANNEL CHANGE

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

A digital television apparatus includes at least one tuner configured to receive digital TV content and at least one processor programmed with instructions to, responsive to a command to change from a first service being presented and associated with a first broadcaster application, identify a broadcaster application associated with a second service. The first broadcaster application is loaded in memory for execution thereof. The instructions are executable to, responsive to identifying the broadcaster application associated with the second service to be the first broadcaster application, not unload the first broadcaster application from memory. The instructions further are executable to, responsive to identifying the broadcaster application associated with the second service to be a second broadcaster application, unload the first broadcaster application from memory and load the second broadcaster application into memory.

In examples, the first broadcaster application includes an advanced television systems committee (ATSC) 3.0 broadcaster application configured to insert replacement content into content received from a transmitter assembly. The digital television system may include the transmitter assembly and may be an advanced television systems committee (ATSC) 3.0 system.

In non-limiting implementations the instructions may be executable to acquire the second broadcaster application from a broadband source, and/or to identify the second service based at least in part on receiving a voice command, and/or identify the second service based at least in part on a channel change or a content listed in a user interface being presented.

In non-limiting examples, the instructions can be executable to identify the second service based at least in part on receiving a channel number. The instructions may be executable to identify the second service based at least in part on past channel behavior to prefetch the second broadcaster application. Also, the instructions can be executable to identify the second service based at least in part on a direction of channel surfing.

In some implementations the receiver can include a first tuner affected by the command and the instructions can be executable to prefetch the second broadcaster application using a secondary tuner. The instructions may be executable to store plural broadcaster applications in storage of the receiver and retrieve broadcaster applications from the storage memory in an order established by a direction of channel surfing.

In some embodiments the instructions may be executable to pre-fetch the second broadcaster application prior to receiving a contextID from the second broadcaster in signaling information.

In another aspect, a digital television apparatus includes at least one processor programmed with instructions to configure the processor to receive from broadcaster equipment a first broadcaster application (BA) associated with a first audio video (AV) service. The instructions are executable to output the first AV service, receive a service change command, and responsive to the service change command, determine whether to load a second BA into memory for execution thereof.

In another aspect, in a digital television, a method includes receiving input at a receiver of digital television to change presentation from a first service to a second service. The method also includes, based at least in part on a direction of service change, prefetching a broadcaster application (BA) associated with the second service prior to presenting the second service, or based at least in part on a history of service change, prefetching the BA associated with the second service prior to presenting the second service, or based at least in part both on a direction of service change and a history of service change, prefetching the BA associated with the second service.

The details of the present application, both as to its structure and operation, can best be understood in reference to the accompanying drawings, in which like reference numerals refer to like parts, and in which:

BRIEF DESCRIPTION OF THE DRAWINGS

FIG. 7 is a flow chart of a feature to trigger acquisition of ATSC 3.0 channels when ATSC 1.0 channels are tuned to.

DETAILED DESCRIPTION

Figure 1:
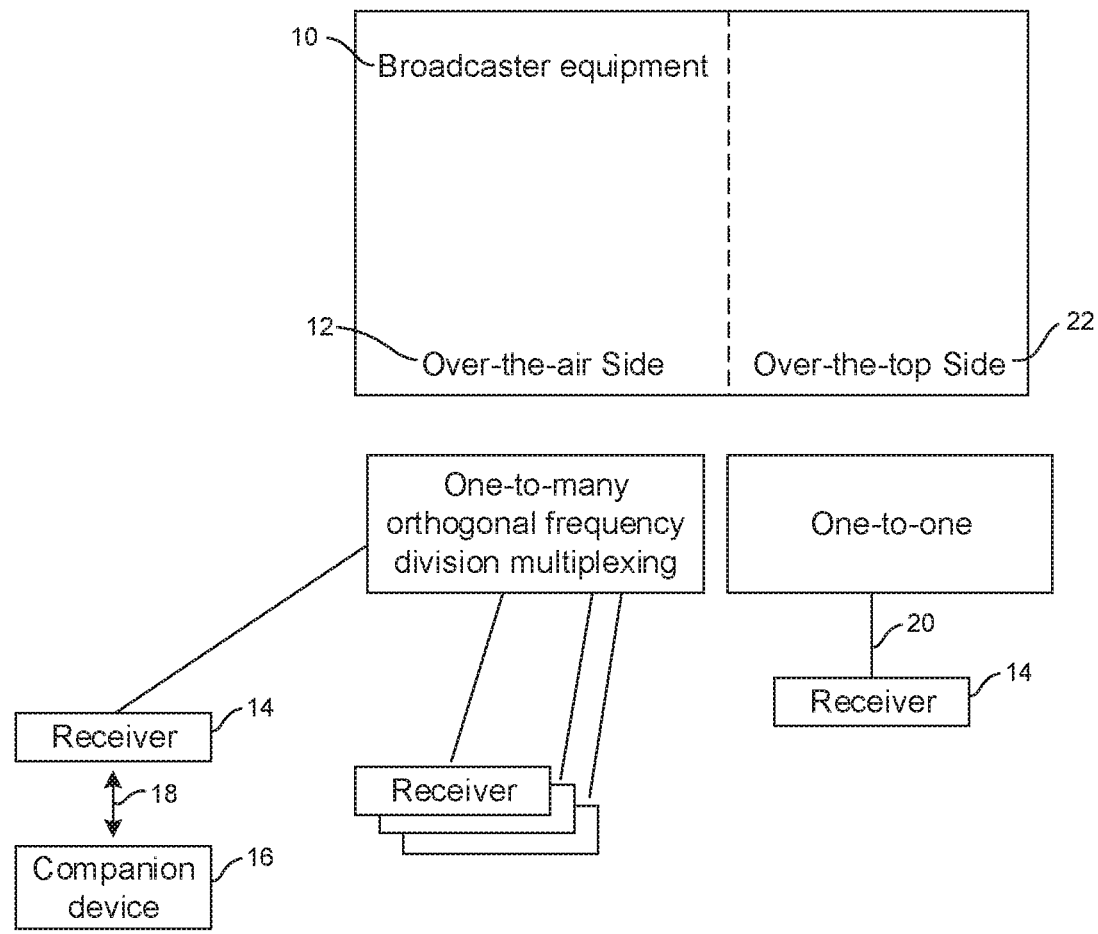
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
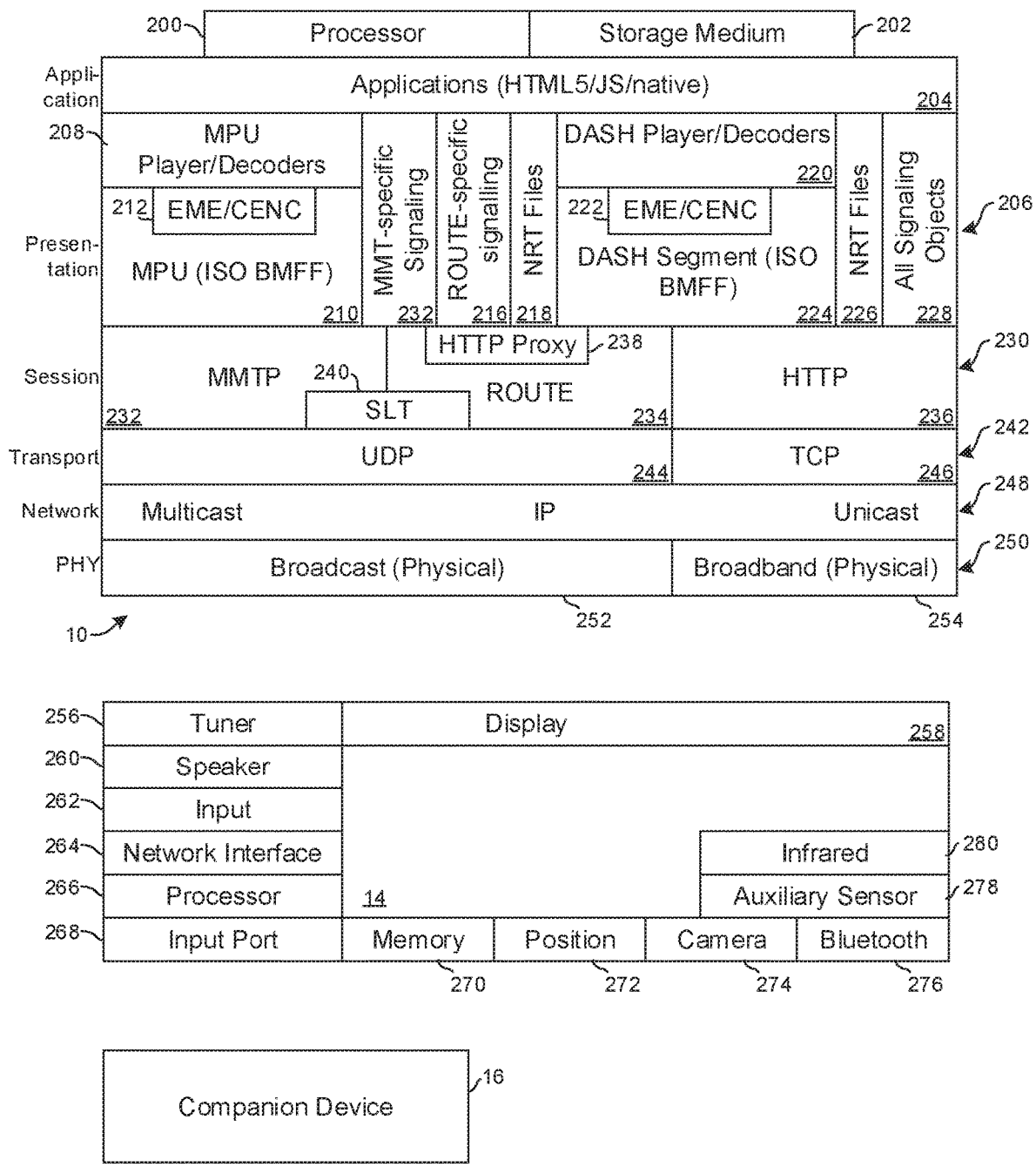
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an optical sensor, a speed and/or cadence sensor, a gesture sensor (for sensing gesture commands) and so on providing input to the processor 266. An infrared (IR) sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
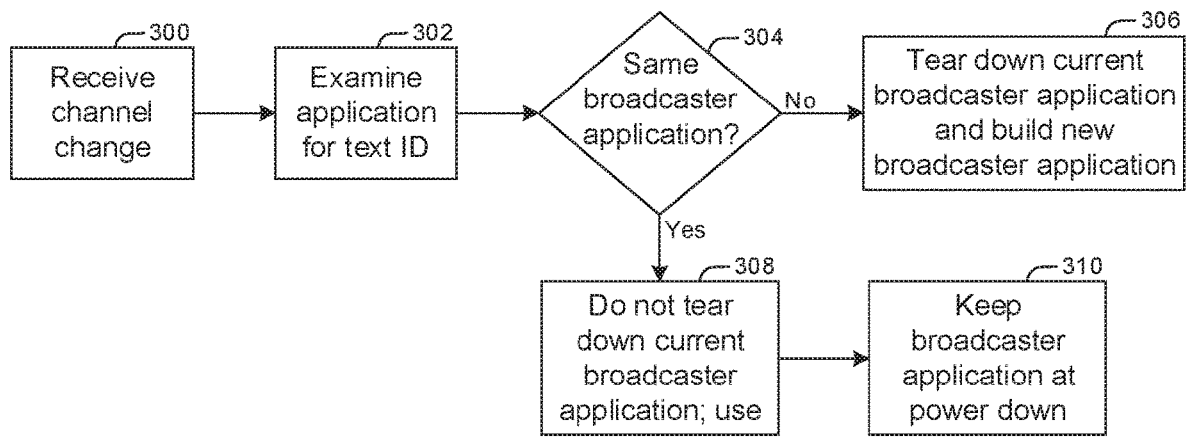
FIG. 3 is a flow chart of example logic consistent with present principles.

Now referring to FIG. 3, in general, when changing channels (or "services") the broadcaster app ("BA"), which is received in the broadcast of the service with which it is associated, might change or it might not change, since multiple services may use the same BA. In the latter case, it is efficient to not have to "tear down" the existing BA (terminating execution of the BA and reallocating its location memory for a new BA) that is about to be used again for the new service being tuned to. An example technique examines the app context ID in service signaling information and if it is the same as that of the current BA, the current BA is maintained. Also, the current BA can be stored on power down such that there is no need to rebuild it on power up if the tuned-to service on power up uses the same BA.

The BA can be stored, and multiple BAs can be stored to prompt faster start up. Furthermore, most viewer behavior is deterministic. This known behavior can be utilized to prefetch or cache BA's. Channel surfing, for example, is often done in a given direction, up or down. Recognizing this, the receiver can prefetch a BA from the broadcast if a secondary tuner is available or from the broadband source. If there is sufficient memory, BAs can be retrieved from memory in the order expected given the direction of channel surfing.

With the above overview in mind and turning now to FIG. 3, a channel change command (referred to in ATSC 3.0 as a service change command) is received at block 300. This may be received by a user directly inputting a new service number, by operating channel up and down keys, or by interpreting a user's voice command suggesting a channel or program, for example. An application context identifier or other identifier associated with the newly tuned-to service and typically received in the broadcast may be identified at block 302. This identifier can indicate an identification of a broadcaster application ("BA") associated with a newly tuned-to service. If the new BA is determined at decision diamond 306 not to be the same as the BA currently loaded into memory for execution, the current BA is torn down (execution is terminated and the memory occupied by the current BA freed up for a new BA) at block 306, and the new BA loaded into memory for execution, which may occur before the new service is fully loaded and presented on the receiver. On the other hand, if the new BA is determined at decision diamond 306 to be the same as the BA currently loaded into memory for execution, the current BA is not torn down at block 308 and execution of the current BA continues uninterrupted.

Block 310 indicates that at power down, the BA of the last tuned-to service is maintained, either in memory or by maintaining its location in storage so that upon power-up it can be immediately reloaded and executed on the assumption that the last tuned-to service will be the service that is tuned to on subsequent power-up.

Figure 4:
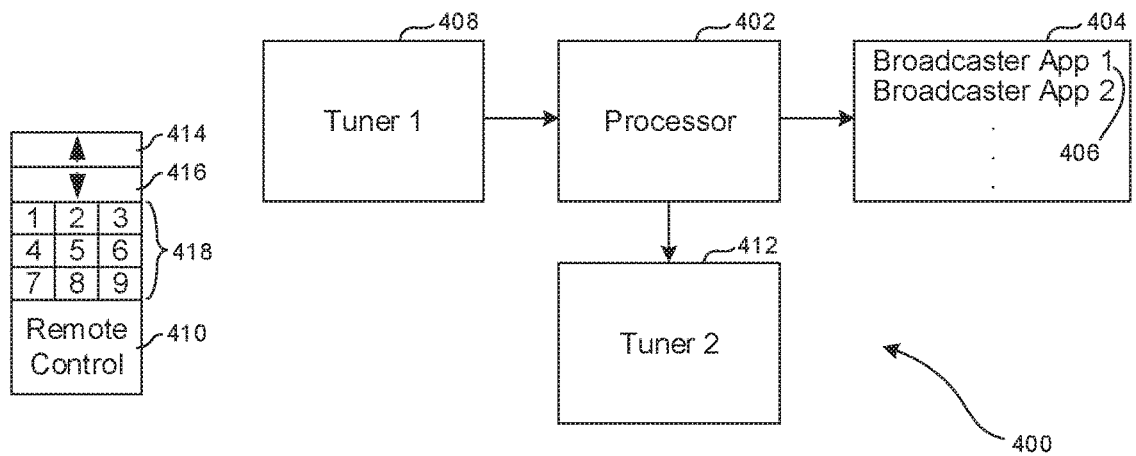
FIG. 4 is a block diagram of an example receiver consistent with present principles.

FIG. 4 illustrates an example receiver 400 that includes one or more processors 402 accessing one or more memories or storages 404 containing one or more Bas 406. The processor 402 can execute a BA associated with a currently tuned-to service being received from a first tuner 408. Responsive to a service change command, e.g., from a remote control (RC) 410, the processor 402 may use a secondary tuner 412 to immediately access a new BA associated with the new service as the first tuner 408 acquires the new service. Or, the receiver may access the new BA via broadband as the new service is being acquired via broadcast. In any case the new BA is accessed more rapidly and is made ready for execution in some cases before the new service is fully acquired and loaded.

In the example shown, the RC 410 includes a channel up key 414, a channel down key 416, numeric keys 418 that can be used to directly input a channel (service) number, and a microphone 420 that can be used to input a channel (service) number, a channel (service) name, a program name, or a program genre.

Figure 5:
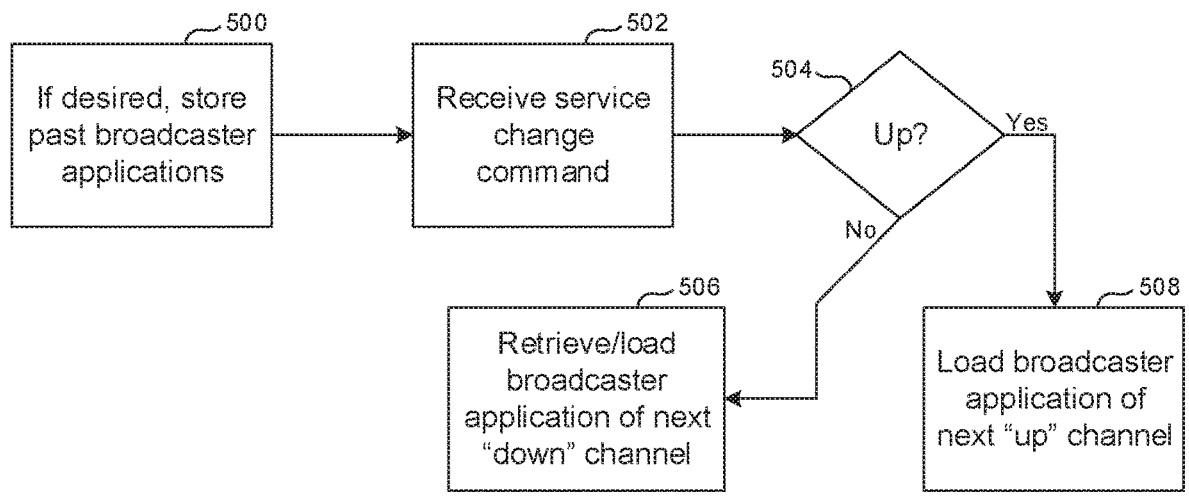
FIGS. 5 and 6 are flow charts of example specific logic consistent with present principles.

FIG. 5 illustrates that past BAs may be stored in storage of a receiver at block 500 if desired. A service change command may be received at block 502 by means of manipulation of one of the channel up/down keys shown in FIG. 4. Decision diamond 504 indicates that if the user is channel surfing by manipulating the channel down key 416, the BA associated with the next channel number in the down direction may be retrieved at block 506 from storage or via broadband for example, prior to fully acquiring and presenting the next service.

If the user is rapidly pressing the channel down key (e.g., with less than a threshold period of time elapsing between successive presses of the channel down key), instead of acquiring the BA of the immediately next channel the logic may acquire the BA of the $N^{th}$ channel down, wherein "N" is an integer greater than one and can increase with increasing speed of manipulating the channel down key.

On the other hand, if the user is manipulating the channel up key 414 the BA associated with the next channel number in the up direction may be retrieved at block 508. If the user is rapidly pressing the channel up key (e.g., with less than a threshold period of time elapsing between successive presses of the channel up key), instead of acquiring the BA of the immediately next channel the logic may acquire the BA of the $N^{th}$ channel up, wherein "N" is an integer greater than one and can increase with increasing speed of manipulating the channel up key.

Figure 6:
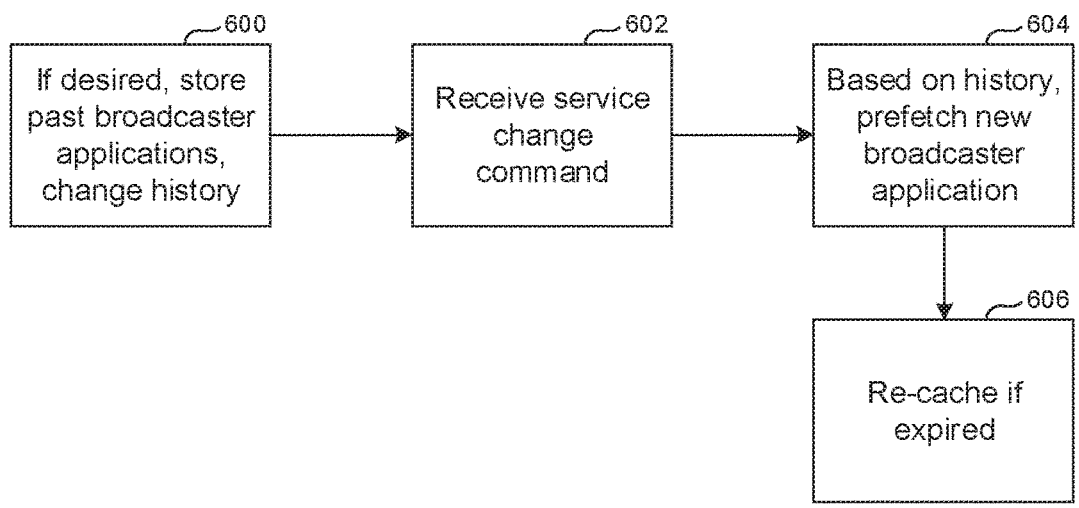

FIG. 6 illustrates that past BAs along with a history of user channel changes (i.e., viewer channel change habits) may be stored in storage of a receiver at block 600 if desired. Note that some or all of BAs that have been received in broadcast (or broadband) download in the past may be stored if desired. To this end, to afford the user more storage space for a number of BAs, the user may be presented with an option to use a storage device such as a plug-in memory stick to expand storage capability of the receiver.

Furthermore, in some cases the geographic region of the receiver may be used to prefetch and store some or all BAs of channels that region. For example, some regions may provide, at least initially, only one or a few next generation TV channels with associated BAs, and the BAs of channels available in the region of the TV may be prefetched and stored. To determine the region the receiver is in, a number of techniques may be used, including identifying what particular electronic program guide (EPG) is being provided to the receiver, with some or all BAs of channels in the program guide being prefetched and stored by the receiver. Or, the user's zip code as provided at time of sale may be used, or the location of the receiver as obtained from a GPS device in the receiver may be used. These are a few examples of how to determine the region the receiver is located in.

A service change command may be received at block 602 by means of manipulation of one of the channel up/down keys shown in FIG. 4 or by means of numeric key input or other means (e.g., by pressing a "last channel" key to return to the last tuned-to channel or by interpreting a voice command).

Proceeding to block 604, based on the channel change history, a new BA is prefetched at block 604 to be loaded and available for execution, in some case before the new service is acquired (that is, before the ContextID information of the channel associated with the new BA being prefetched is received) and ready for presentation. For example, if the history of channel change indicates a pattern of surfing to service A for a few seconds, then to service B for a few seconds, then to service C, the BAs for services A, B, and C may all be prefetched for loading in order without waiting for the user to complete the historical surfing pattern. Likewise, if the history indicates a toggling between two favorite services, the BA of the service not currently tuned to may be enqueued for loading into memory immediately upon receipt of a channel toggle command (e.g., a press of the "last channel" key.)

Moreover, channel change patterns for particular times of day may be stored and used in prefetching BAs. For example, if in the morning period past channel toggles between a news channel and a cooking channel have been repeated, the BAs of both channels may be stored and prefetched as appropriate. Other viewer/user channel change habits may be used to prefetch a BA for a channel before the contextID for that channel has been received in signaling information. The user voice may be used to identify the user to use the channel change patterns, channel change habits of the user, or any other functions.

The BAs may be stored and prefetched based on a genre of contents. For example, when the user speaks a voice command representing a category of contents (e.g. "Baseball", "Movies on TV",) the BAs of channels corresponding to the category of contents may be stored and prefetched. The contents corresponding to the voice command may be listed and shown to the user via a UI, and the user may choose one of the channels with the UI by operation of the remote controller or voice command. In this case, the channel change process may comprise plural steps to determine a desired channel (e.g. a category determination step and a channel determination step.)

Block 606 of FIG. 6 indicates that in the event signaling from the broadcaster indicates that a prior BA is expired, a new BA can be re-cached.

Figure 7:
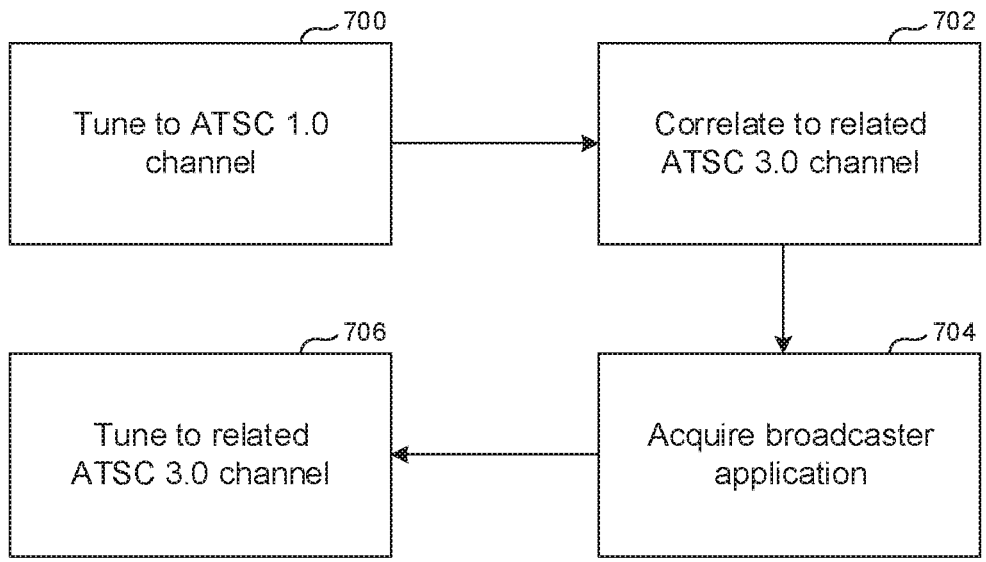

FIG. 7 illustrates triggering ATSC 3.0 channel acquisition responsive to ATSC 1.0 channel tuning. Commencing at block 700, the receiver is tuned to an ATSC 1.0 channel. At block 702 the receiver may identify that the ATSC 1.0 channel is related to an equivalent ATSC 3.0 channel showing, for example, the same content as the ATSC 1.0 channel. The BA of the ATSC 3.0 channel may be received at block 704 and the ATSC 3.0 channel automatically tuned to at block 706.

Figure 8:
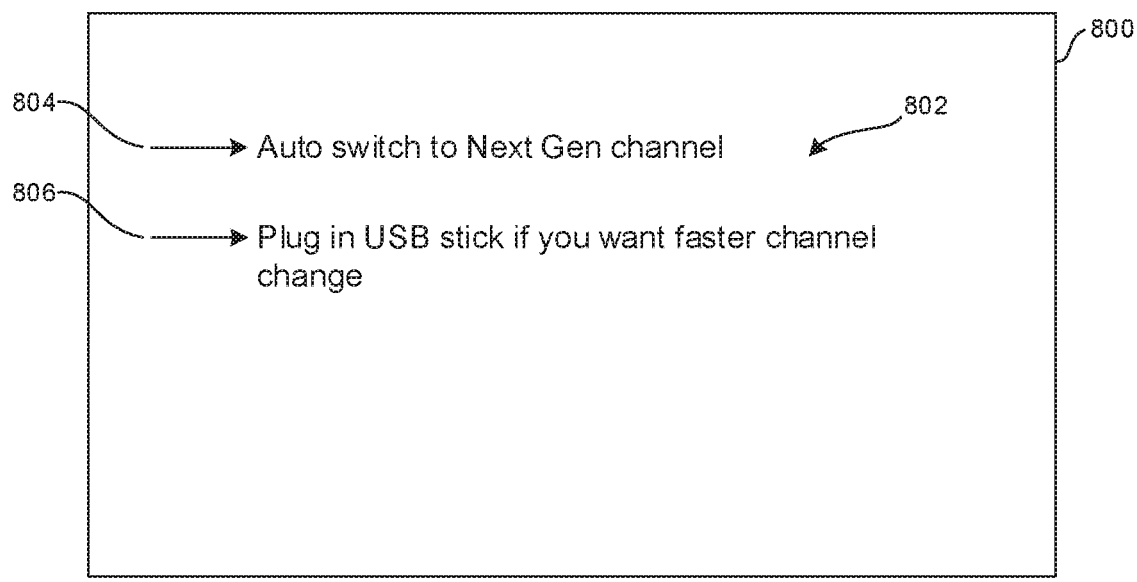
FIG. 8 is a screen shot of an example user interface (UI) consistent with present principles.

FIG. 8 illustrates a receiver display 800 in which a UI 802 may be presented and may include a switch selector 804 selectable to enable the logic of FIG. 7. The selector 804 may be toggled to disable the logic of FIG. 7. Also, recall that the user may be given the opportunity to expand the memory of the receiver, and if desired in this regard an offer selector 806 may be presented to advise the user to add memory (in the example shown, to plug in a USB memory stick) to facilitate faster channel change (by means of caching and presenting BAs in a prospective manner as described herein).

It will be appreciated that whilst present principals have been described with reference to some example embodiments, these are not intended to be limiting, and that various alternative arrangements may be used to implement the subject matter claimed herein.

What is claimed is:

1. A digital television apparatus comprising:
   at least one tuner configured to receive digital TV content,
   at least one processor programmed with instructions to:
   responsive to a command to change from a first service being presented and associated with a first broadcaster application, identify a broadcaster application associated with a second service identified by the channel change command, the first broadcaster application being loaded in memory for execution thereof;
   responsive to identifying the broadcaster application associated with the second service to be the same broadcaster application as the first broadcaster application, not unload the first broadcaster application from memory and execute the first broadcaster application to present the second service; and
   responsive to identifying the broadcaster application associated with the second service to be a second broadcaster application different from the first broadcaster application, unload the first broadcaster application from memory and load the second broadcaster application into memory for execution of the second broadcaster application in presenting the second service.

2. The digital television apparatus of claim 1, wherein the first broadcaster application comprises an advanced television systems committee (ATSC) 3.0 broadcaster application configured to insert replacement content into content received from a transmitter assembly.

3. The digital television apparatus of claim 1, wherein the instructions are executable to acquire the second broadcaster application from a broadband source and/or to identify the second service based at least in part on a voice command.

4. The digital television apparatus of claim 1, wherein the instructions are executable to identify the second service based at least in part on a channel or a content listed in a user interface being presented.

5. The digital television apparatus of claim 1, wherein the instructions are executable to identify the second service based at least in part on receiving a channel number.

6. The digital television apparatus of claim 1, wherein the instructions are executable to identify the second service based at least in part on past channel change behavior to prefetch the second broadcaster application prior to receiving a contextID from the second broadcaster in signaling information.

7. The digital television apparatus of claim 1, wherein the instructions are executable to identify the second service based at least in part on a direction of channel surfing.

8. The digital television apparatus of claim 1, wherein the digital television apparatus comprises a first tuner affected by the command and the instructions are executable to prefetch the second broadcaster application using a second tuner.

9. The digital television apparatus of claim 1, wherein the instructions are executable to store plural broadcaster applications in storage of the digital television apparatus and retrieve broadcaster applications from the storage memory in an order established by a direction of channel surfing.

10. A digital television apparatus comprising:
    at least one processor programmed with instructions to configure the processor to:
    receive from broadcaster equipment a first broadcaster application (BA) associated with a first audio video (AV) service;
    output the first AV service at least in part using the first BA;
    receive a service change command identifying a second service;
    responsive to the service change command, determine whether to load a second BA associated with the second service into memory for execution thereof in rendering the second service, the second BA being loaded into memory for execution thereof to provide the service responsive to determining that the second service is associated with the second BA and the first BA remaining in memory and being used to render the second service responsive to determining that the second service is associated with the first BA.

11. The digital television apparatus of claim 10, wherein the instructions are executable to determine whether to load the second BA into memory for execution thereof based at least in part on receiving a voice command.

12. The digital television apparatus of claim 10, wherein the instructions are executable to determine whether to load the second BA into memory for execution thereof based at least in part on a channel or a content listed in a user interface being presented.

13. The digital television apparatus of claim 10, wherein the instructions are executable to determine whether to load the second BA into memory for execution thereof based at least in part on receiving a channel number.

14. The digital television apparatus of claim 10, wherein the instructions are executable to determine whether to load the second BA into memory for execution thereof based at least in part on past channel change behavior to prefetch the second broadcaster application.

15. The digital television apparatus of claim 10, wherein the instructions are executable to determine whether to load the second BA into memory for execution thereof based at least in part on a direction of channel surfing.

16. The digital television apparatus of claim 10, wherein the digital television apparatus comprises a first tuner affected by the command and the instructions are executable to prefetch the second broadcaster application using a second tuner.

17. The digital television apparatus of claim 10, wherein the instructions are executable to store plural broadcaster applications in storage of the digital television apparatus and retrieve broadcaster applications from the storage memory in an order established by a direction of channel surfing.

18. In a digital television, a method comprising:
    receiving input at a receiver of digital television to change presentation from a first service to a second service; and
    based at least in part on a direction of service change, prefetching a broadcaster application (BA) associated with the second service prior to presenting the second service, or
    based at least in part on a history of service change, prefetching the BA associated with the second service prior to presenting the second service, or
    based at least in part on a direction of service change and a history of service change, prefetching the BA associated with the second service, or based at least in part on a voice command, prefetching the BA associated with the second service, or based at least in part on a channel or a content listed in a user interface being presented, prefetching the BA associated with the second service, wherein the first service is associated with a first BA and the first BA remains in memory to render the second service responsive to identifying that the second service is associated with the first BA, and otherwise, responsive to identifying that the second service is associated with a second BA, the second BA is loaded into memory to execute the second service.

19. The method of claim 18, comprising, based at least in part on a direction of service change, prefetching a broadcaster application (BA) associated with the second service prior to presenting the second service.

20. The method of claim 18, comprising, based at least in part on a history of service change, prefetching the BA associated with the second service prior to presenting the second service.

\* \* \* \* \*